United States Patent [19]

Berry et al.

[11] 3,800,802

[45] Apr. 2, 1974

[54] SHORT-WAVE THERAPY APPARATUS

[75] Inventors: Fred M. Berry, Overland Park; James N. Shirley, Leawood; Eugene C. Lipsky, Prairie Village, all of Kans.

[73] Assignee: International Medical Electronics Ltd., Kansas City, Mo.

[22] Filed: Jan. 7, 1972

[21] Appl. No.: 216,069

[52] U.S. Cl. .................. 128/422, 128/404

[51] Int. Cl. .................. A61n 1/40

[58] Field of Search ........... 128/404, 405, 413, 421, 128/422; 285/85, 86, 87; 58/24 A, 39 S

[56] References Cited

UNITED STATES PATENTS

| | | | |
|---|---|---|---|
| 3,566,877 | 3/1971 | Smith et al. | 128/422 |
| 3,329,148 | 7/1967 | Kendall | 128/422 |
| 3,543,762 | 12/1970 | Kendall | 128/422 |
| 2,838,672 | 6/1958 | Paust | 128/422 |
| 3,090,192 | 5/1963 | Kraft et al. | 158/39.5 |
| 3,016,556 | 1/1962 | Greenleaf | 287/86 |
| 2,970,226 | 1/1961 | Skelton et al. | 58/39.5 |
| 2,752,496 | 6/1956 | Martens | 128/422 |
| 3,638,657 | 2/1972 | Mettler | 128/422 |

FOREIGN PATENTS OR APPLICATIONS

| | | | |
|---|---|---|---|
| 32,302 | 3/1934 | Netherlands | 128/413 |
| 748,190 | 5/1953 | Germany | 128/422 |

OTHER PUBLICATIONS

Westinghouse X-ray Co. Inc., Bulletin No. 52, Nov. 1938, pp. 1–15.

*Primary Examiner*—William E. Kamm
*Attorney, Agent, or Firm*—Lowe, Kokjer, Kircher, Wharton & Bowman

[57] ABSTRACT

A short wave therapy apparatus has two treatment heads enabling an operator to treat two separate areas of a patient at one time or to treat two patients simultaneously. The circuit includes a crystal oscillator, a pulse modulator, an RF buffer, an RF power amplifier and a "pi" network which precedes the interconnection with the attaching cables and the treatment heads. Each one of the cables is specifically selected in length so that it will be approximately a quarter wave electrical length thereby fixed tuning each one of the heads, varied only in ½ wave electrical lengths.

An RF sample is picked off of the output from the RF power amplifier through a capacitive divider. The RF sample is fed back through a peak rectifier to a summing point where it is compared with the voltage on a pulse amplitude reference step switch and is delivered to a pulse amplitude control circuit. Further, a pulse generator and pulse rate control circuits are connected to the pulse modulator for control purposes. Accordingly, the correct power amplitude is maintained regardless of the loading on the particular heads. An oscilloscope is connected to the capacitive divider for the purpose of monitoring the operation of the apparatus.

7 Claims, 13 Drawing Figures

SHORT-WAVE THERAPY APPARATUS

BACKGROUND AND BRIEF DESCRIPTION OF THE INVENTION

A diathermy apparatus for treatment of living matter essentially calls for the passage of an electrical current therethrough. The usual process is for RF energy to be applied to the human body and with the human body acting as a dialectric so that the current flow in the body would be predicated on the amplitude of the pulse applied thereto as well as the pulse width and rate. It was found that the heat generated by this current flow produced a therapeutic effect and, while beneficial results obtained therefrom are not fully understood, this application of RF energy has been utilized for a number of years.

Prior art electrotherapeutic equipment utilize a single induction or treatment head which was tunable at a resonant frequency for optimum transmission of RF energy into the body. The single head was sometimes tuned by varying the distance between two capacitance plates either directly on the head itself or internally of the cabinet normally associated therewith. In any event, the apparatus required that the tuning be accomplished in conjunction with the patient's body for efficient operation.

The subject invention relates to an improved electrotherapeutic or short wave therapy apparatus which has a single control system power supply operatively connected with two heads for inducing the RF energy into the patient or patient's body. The control system power supply includes a crystal oscillator which produces a standard 27.225 Mhz signal. This signal is fed to a pulse modulator from thence to an RF buffer and an RF power amplifier, through a pi network and to the two induction treatment heads. The signal from the pi network to each treatment head is carried via a cable of selected length which have been calculated to assure a constant output voltage under varying load conditions. This balancing of the heads results in an equalization of the power emission between the two.

A capacitive divider circuit is located before the pi network and provides a pick off point and a feedback circuit to control the pulse rate and the pulse amplitude. The RF sample is picked off at the capacitive divider, peak rectified and delivered to a summing point. At the summing point, the peak rectified RF sample is compared with a reference and sent through a pulse amplitude control circuit which operates in conjunction with a pulse rate control circuitry for finally biasing the pulse modulator in the appropriate direction to effect control of the pulse amplitude. Additionally, a monitoring oscilloscope is connected with the RF sample point to permit the visual observation of the apparatus operation.

The RF amplifier includes circuitry which will enable the grounded grid tetrode portion thereof to become very stable and to operate with less grid current thereby prolonging the normal lifetime of the tube utilized therewith. Further, a leveling circuit will sense the output voltage and operate to control plate swing through a type of a servo mechanism. Finally, a timer circuit will include a countdown and reset function so that the patient exposure time is both accurate and resettable by the mere activation of a switch.

The mechanical arrangement of the two headed electro-therapeutic apparatus includes a novel friction lock and a ball joint swivel construction that will permit maximum utilization of the induction treatment heads and the optimum positioning of same. The friction lock permits the arms to be locked by the manipulation of a knurled headed screw arrangement. The arms may then be movably positioned to an optimum patient location without readjustment of the knurled head. The block further includes the interleaving of a plurality of plates that are keyed at the articulated joint to alternated arms. This interleaving provides a multiple surface without having a large diameter surface for the fixed location of either arm on either side of the joint.

The above-mentioned ball joint design includes a notched socket joint and a tapered shaft interconnected with the ball so that the tapered shaft may be moved within the notch thereby fixedly locating the ball and associated head and also permitting additional movement of the associated head with respect to the socket location.

An object of the invention is to provide a uniquely constructed electrotherapeutic apparatus having at least two induction treatment heads with a single control system power supply.

Another object of the invention is to provide a uniquely constructed electrotherapeutic apparatus of the type known as diathermy equipment wherein one or more induction heads utilized therewith are fixed tuned. It is a feature of this object that the tuning of the head or heads may be accomplished at least in part by a coaxial cable or cables of a selected approximately quarter wave electrical length size.

A still further object of the invention is to provide a uniquely constructed electrotherapeutic treatment apparatus which is operable as a diathermy means for inducing RF energy into a patient's body and in which the amplifier circuitry therein includes a means for enabling same to become very stable and to operate with appreciably less grid current than was heretofore required.

A further object of the invention is to provide in a electrotherapeutic treatment apparatus, a unique leveling circuit which maintains constant output of voltage or peak intensity of the RF signal. It is a feature of this object that an RF sample is taken at the plate of a vacuum tube in the RF power amplifier and that this voltage is compared with a reference and used via feedback circuitry tube control the amplitude from the RF power amplifier.

A further object of the invention is to provide a pulse monitoring scope in an electrotherapeutic treatment apparatus. It is a feature of this object that an oscilloscope is mounted on the cabinet of said electrotherapeutic treatment apparatus and is connected to the plate of an RF power amplifier utilized therein. This voltage at the plate of the RF power amplifier accordingly permits the operator of the electrotherapeutic apparatus to monitor both the amplitude and the rate of the RF signal applied to the treatment head (or heads).

A significant object of the invention is to provide a uniquely constructed electrotherapeutic treatment apparatus which economizes on the use of internal circuitry but which substantially increases the treatment capabilities from a single control system and power supply.

Another significant object of the invention is to provide an electrotherapeutic apparatus which has the treatment induction head thereof fixed tuned so that additional tuning to compensate for presence of a patient's body or body portion is unnecessary.

Another significant object of the invention is to provide an electrotherapeutic treatment apparatus having a plurality of induction heads with the induction heads being fixed tuned and having a means for insuring that the peak intensity of the RF energy radiating from the heads is maintained constant regardless of the selected level.

These and other objects of the invention, together with the feature of novelty appurtenant thereto, will appear in the course of the following description.

DETAILED DESCRIPTION OF THE INVENTION

In the accompanying drawings, which form a part of the specification and are to be read in conjunction therewith and in which like reference numerals are employed to indicate like parts in the various views:

FIG. 1 is a block diagram of the electrotherapeutic apparatus;

FIG. 1*a* is a schematic diagram of an alternative double pi interconnection with the two induction heads, this interconnection being substitutable for the single pi networks shown both in FIGS. 1 and 3.

Figures 1, 1A:
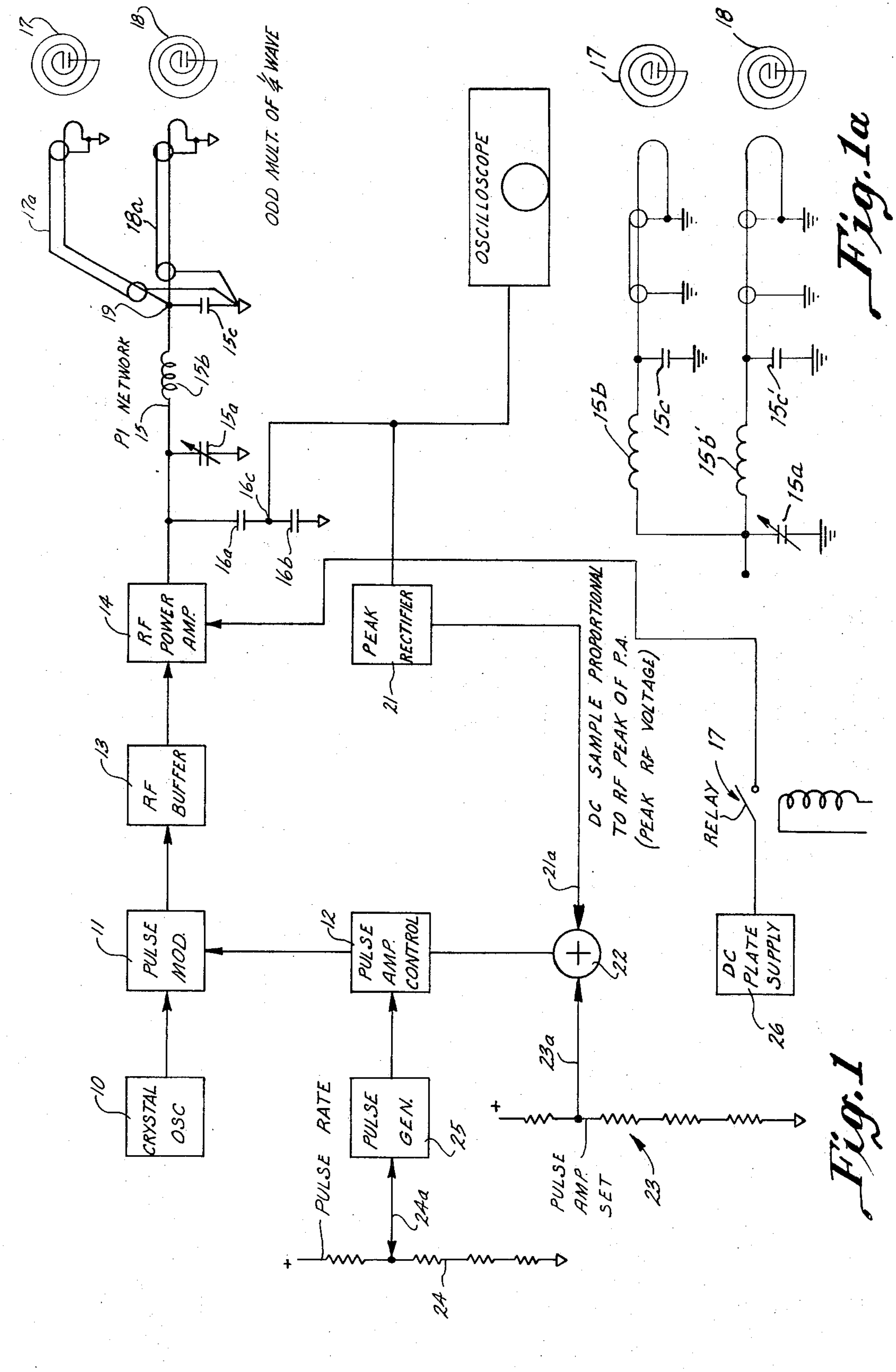

Turning now more particularly to FIG. 1, reference numeral 10 diagrammatically represents a crystal oscillator having a standard frequency of 27.225 Mhz which is within the permissible frequency range allocated for a diathermy service. It is, of course, understood that this particular frequency can be modified and/or changed if the allocation for same were to be varied without affecting the theory of operation of the subject invention.

The output from crystal oscillator 10 is delivered to a pulse modulator 11, same being capable of varying the amplitude of any signal passing therethrough. As will be seen, the pulse amplitude control (12) output signal which is essentially a DC voltage will be utilized to vary amplitude of the output of pulse modulator 11. The RF buffer 13 receives the output of pulse modulator 11 and additionally amplifies the RF signal while at the same time furnishing drive to the RF power amplifier. RF energy from the power amplifier is delivered to a "pi" network 15 which schematically includes a variable capacitor 15*a*, an inductor 15*b* and a fixed capacitor 15*c* to thereby form a portion of an impedance matching network. Also, at the output of the RF power amplifier, a capacitive divider represented by the capacitors 16*a* and 16*b* permit an RF sample to be taken therebetween and with the RF sample fed directly to a later described peak rectifier (21) and oscilloscope (20).

The output from the pi network 15 delivers the RF energy to two induction heads generally indicated by the number 17 and 18. In any event, the two heads are tied to a summing point 19 by an approximate quarter wave length lines 17a and 17b respectively. It has been found that by tying the ends of the approximate (actually the selected length is highly less than a quarter wave electrical length) quarter wave length cables to a summing point at the output of power amplifier 14, that an equal division of power is accomplished therebetween providing that the lines 17*a* and 17*b* (coaxial lines) are of a proper length to provide the necessary impedance match. Actually, the point 19 operates as a division point rather than a summing point, further, since the amount of RF energy emanating from the two heads is proportional to the actual RF voltage sample (at point 16c between the capacitive divider 16*a* and 16*b*), the RF sample at point 16*c* is a representation of the power to be maintained.

FIG. 1*a* shows an alternative and similar connection which includes two pi networks, one for each head, as shown in FIG. 1*a*, the variable capacitor will have a second pi network connecting head 18 via 18*a*. This network includes inductor 15*b*, and fixed capacitor 15*c*'. The second pi network is necessary to balance the heads 17 and 18.

Figures 6, 7:
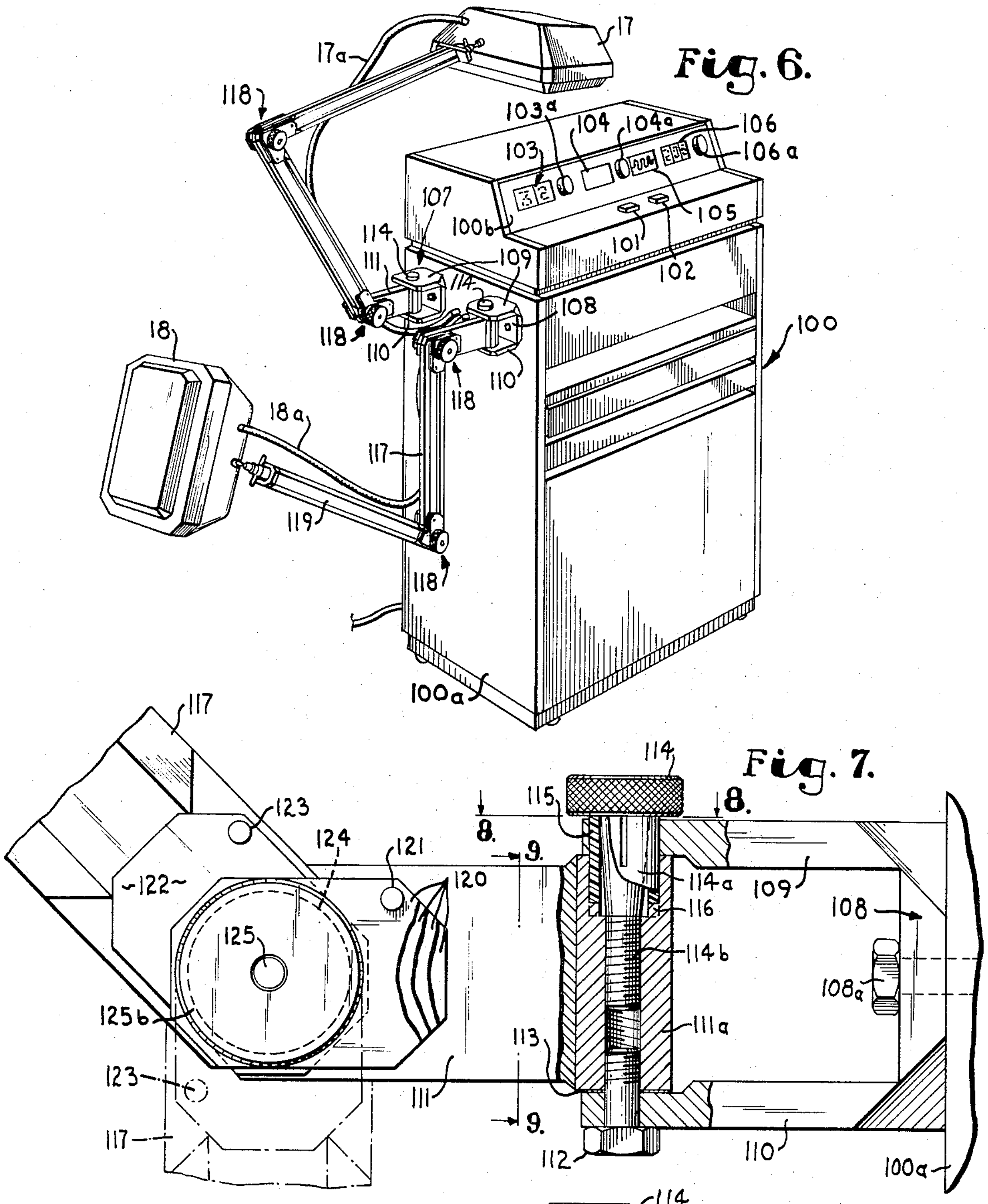
FIG. 6 is a perspective view of the electrotherapeutic apparatus and its operative physical form.
FIG. 7 is a side elevational view of the interconnecting structure of the support arms for the electrotherapeutic apparatus with portions of interconnecting means broken away for clarity and with the broken lines indicating alternative positions of one of the arm segments.
Figure 9:
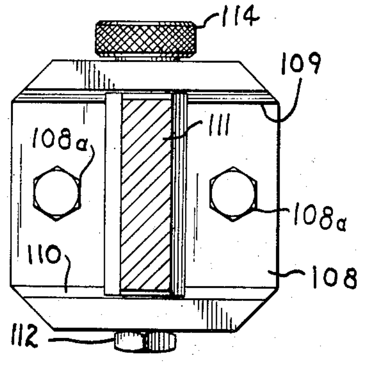
FIG. 9 is a sectional view taken generally along the line 9—9 of FIG. 7 in the direction of the arrows.

As mentioned above, the RF sample will be peak rectified at 21 (and also delivered to oscilloscope 20) and delivered via line 21*a* to summing point 22. A reference voltage is selected by utilization of a reference step switch 23 with same being applied directly via line 23*a* to the other portion of the summing point. By utilization of an operational amplifier type device, the peak rectified RF voltage is compared with the reference voltage so that if the power started to fall for any reason the voltage on line 21*a* would be less than the voltage on line 23*a* and an error signal would go into the pulse amplitude control circuit 12 and bias pulse modulator 11 in a proper fashion to force the peak rectified RF voltage to equal the reference voltage on line 23*a*. Accordingly, a feedback technique is utilized to maintain the required peak intensity of the electromagnetic energy that is radiated interiorly of the body of the patient through heads 17 and 18. Finally, another pulse rate step switch 24 with a slide connector 24*a* feeds a pulse generator 25 so that the pulse rate as well as the pulse amplitude control may be utilized to effect the pulse modulator 11 in a variable manner. As shown by FIG. 6 there will be manually operable switches on the cabinet 100 of the electrotherapeutic apparatus for rate, power and time. The rate switch 103a will be utilized to operate the stepswitch 24 while the power switch 104a will operate the amplitude reference stepswitch 23. The time set switch 106a will be discussed infra, however, a means is provided to count down and reset same when a desired time interval is selected for treatment purposes. Finally, a DC plate supply voltage 26 operates through relay 27 to bias the RF power amplifier 14 and as such is cooperatingly utilized with respect to the timing mechanism.

With respect to the above mentioned RF sample, it has been found that same represents the required power to be maintained on the output. Further, the output of the RF power amplifier more closely indicates the actual RF energy emanating from the heads 17 and 18. In other words, if the amplitude of the RF power amplifier is high, the RF energy through the heads is also high. If, for example, the sample was taken at the division point even a very slight deviation in the tuning would substantially effect same. This may be seen in that if the heads were not quite balanced, then one head could possibly be completely shut off, with other head operating with substantially all of the power being radiated therethrough.

The peak rectifier 21 gives a more accurate relationship in the feedback network than an average rectifier would, and this is because it is the peak intensity of the RF energy radiation in the heads as correlated to the output of the RF power amplifier that is the parameter that is to be controlled. With the above described feedback loop maintaining the correct power amplitude regardless of the positioning of the two heads with respect to the body of the patient, the operational amplifier theory of a variable reference voltage always returns the RF output to the selected power level.

As will be described in more detail, the oscilloscope monitoring means is connected to the output of the capacitor divider in such a manner that the width amplitude and repetition rate of the pulses are visibly apparent to the operator. Since the horizontal axis of the scope is set at the constant rate, it is possible to visually observe the pulse rate. Also, as the amplitude of the output pulses is represented on the scope, a direct correlation with the power setting on the exterior of the cabinet is available. Accordingly, if there are no pulses visible on the scope or if the pulses appear distorted it may be assumed that the apparatus is not functioning normally.

The electronic circuitry that is associated with the block diagram in FIG. 1 may be constructed on individual printed circuit borads and installed within the cabinet 100 according to function and the general physical aspects as concerns the packaging and normal assembly techniques. Also, since the functioning circuitry operates in a closed loop fashion individual circuit boards may be effectively considered singly and with their further relationship to the overall block diagram kept in mind.

Figure 5:
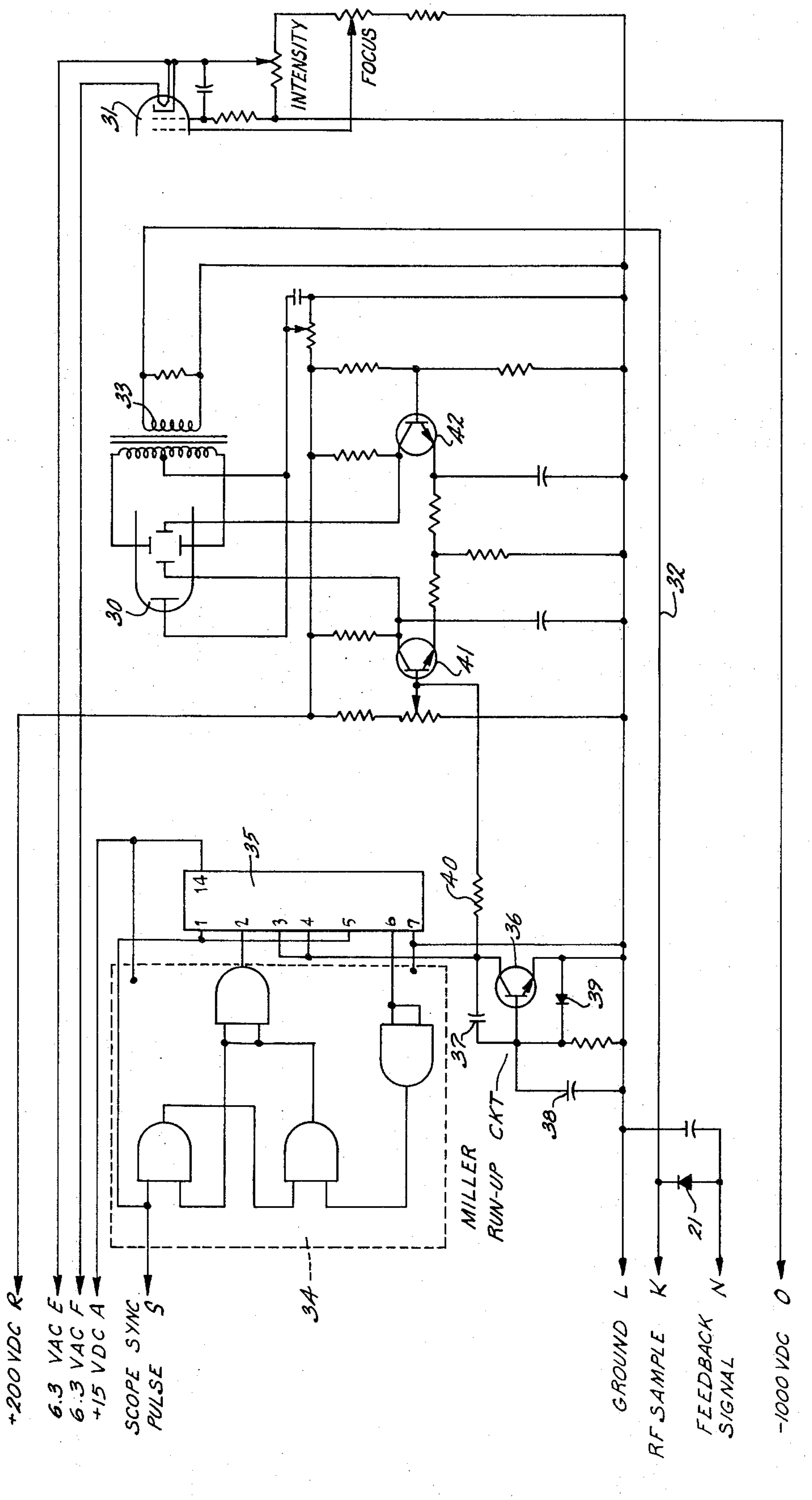
FIG. 5 is a schematic diagram of the oscilloscope board which is used to monitor the outputs of the induction heads of the electrotherapeutic apparatus.

Turning now to the scope circuit board which is shown in FIG. 5, reference numerals 30 and 31 combine to represent the oscilloscope. For convenience of illustration the oscilloscope tube may be thought of as a conventional one and with the above mentioned numerals merely being used for convenience of identification and its connection with the remainder of the circuit. In any event, the tube half 30 contains the deflection plates which connected in the conventional manner while tube half 31 has the cathode, and the intensity and focus grids therein. Since it is important that an oscilloscope have a steady display, the RF sample picked off of point 16c (as shown in the block diagram FIG. 1) is indicated as entering pin K on the scope board. The RF sample is transmitted via line 32 to the primary winding of transformer 33, same being connected into the scope tube half 30. This transformer then effects the scope visual representation of the RF power output although the additional circuitry enables the controlling of same in a more meaningful manner.

The left hand portion of the scope board contains two integrated circuit packages designated by the numerals 34 and 35. In actual practice, the pulse generator 25 (FIG. 1) will supply a pulse coming in on pin S which is the scope synchronizing pulse. As soon as the pulse is received the integrated circuit 34 is latched. It should be pointed out the gates in the integrated circuits are connected back to back so that same act as a flip-flop. A 65 microsecond pulse is developed in the integrated circuit 34 producing a high input to the pins 1 and 5 on integrated circuit 35. The output on pin 6 of integrated circuit 35 precludes the resetting of the flipflop until the 65 microsecond pulse is terminated. At this time the resetting of the flipflop (integrated circuit 34) is permitted so that it is ready for another pulse. In effect, the circuit 34 acts as a flipflop with which circuit 35 acts as a sawtooth generator with the generator operating during this time period controlled by the two elements (34 and 35).

Transistor 36 which is connected to the output pins 3 and 4 of the sawtooth generator 35 and forms a portion of what is commonly called a "Miller Run Up" circuit. The transistor (36) and related capacitors 37 and 38 operate as an integrator that linearizes the sawtooth wave generated by 35. The diode 39 across the emitter-base circuit of transistor 36 acts to quickly reset the discharge path so that the actual voltage (swings) going over to the scope via the resistor 40 is initially delivered to a differential amplifier.

The differential amplifier is comprised of transistors 41 and 42. The amplifier is used as a horizontal amplifier to move the beam right and left on the scope. In other words, the above described circuitry delivers a sawtooth wave out of the sawtooth generator and Miller Run Up circuit combination (transistor 36) to the differential amplifier and from thence to tube portion 30 of the oscilloscope. The vertical axis is the RF sample which is applied via line 32 to the primary coil 33 of the transformer in the tube half 30.

Figure 2:
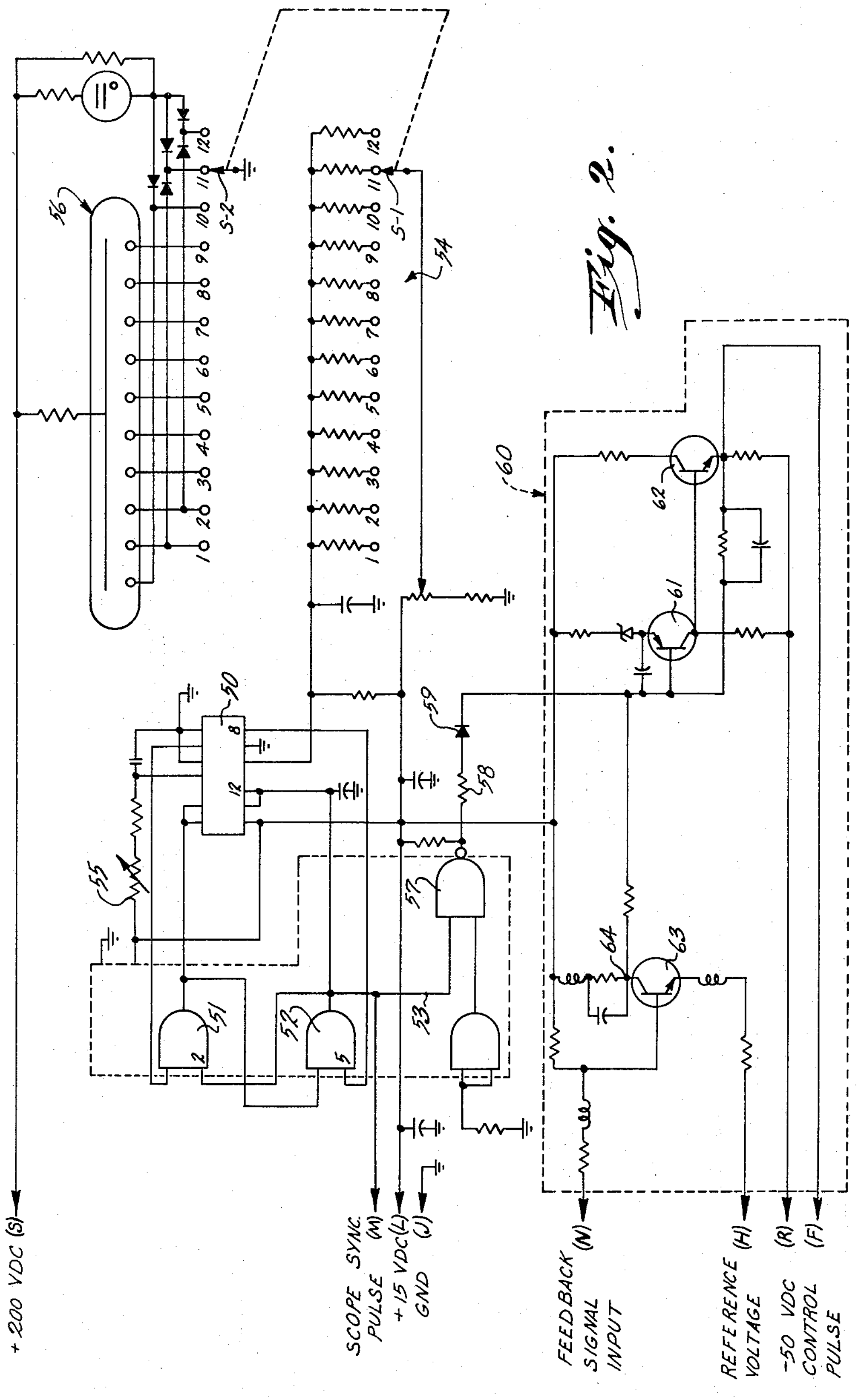
FIG. 2 is a schematic diagram of the rate board which includes the leveling circuit associated therewith.

The rate board is shown in the FIG. 2 and will contain the necessary circuit connections to determine the rate of RF energy that is being applied to the patient through the output heads. The principal function of the rate board is to generate a 65 microsecond pulse and to provide a means for varying the repetition rate of this pulse.

The circuitry will include a pulse stretcher integrated circuit 50 which is in effect two one shot multivibrators which are series connected within the integrated circuit package. One of the one shot multivibrators has an output lasting for 65 microseconds and when it runs out it operates to trigger the second "one shot" which in turn has an eventual output which will trigger the first "one shot" again. The gates 51 and 52 are interconnected to form a flipflop circuit which is operated from the outputs of the two one shot multivibrators that are packaged within the pulse stretcher 50. Accordingly, the pulse stretcher outputs from pin 8 (to the input of pin 5 on gate 52) and the output from pin 12 (to the input of pin 2 on gate 51) cause a 65 microsecond pulse to be developed on line 53 with the repetition rate (the distance between the pulses) being controlled by the step switches (generally indicated by the numeral 54) and effected by the operation of the second one shot within the package 50. The switch S-1 varies the time period of the second one shot within the package 50. Also, the variable resistor 55 (which may be a screw driver adjustable resistor) operates to determine the length of the pulse originated by the first one shot within the pulse stretcher package 50. The switch (or slide contact) S2 is ganged to S-1 so that the associated display tube 56 will illuminate the appropriate number therein depending on which one of the resistive settings which S2 has been interconnected with.

The output (from the flipflop, i.e., gate 51 and 52) on line 53 will be delivered to the input of gate 57 which acts as an inverter and delivers pulse output through resistor 58 and diode 59 to a leveling circuit which is indicated as being within the broken line 60.

As suggested above, the pulse, with the variable repetition rate, will be delivered to the leveling circuit through resistor 58 and diode 59 to the base of transistor 61. These pulses gate transistor 61 on and off and are fed via the base collector circuit of transistor 61 to the base of an emitter follower transistor 62. Actually, the diode 59 will act as a diode clamp to bias the transistor 61 off until the occurrence of the 65 microsecond pulse.

As shown in the lower left hand portion of FIG. 2, the feedback signal appearing on pin N and at this point is the peak rectified RF signal. Transistor 63 operates as a comparator which uses the point 64 as a summing point (shown as point 22 in FIG. 1). In other words, the difference of voltage between the rectified RF sample and the clamp level of the voltage through diode 59 to the base of transistor 61 will appear at the summing point 64 (the collector of the transistor 63). Accordingly, the height or amplitude of the pulse going to the RF chassis through the emitter follower 62 is controlled by the limiting effect of the comparator transistor 63. Stated another way, the clamp level voltage is the voltage at the summing point 64 and it is this value that will appear on the base of the transistor 61 thereby regulating the amplitude of the pulse to a preselected value thereby effectively maintaining the peak intensity of the output voltage at a prescribed level. As will become apparent, this control pulse is in effect the RF voltage at the plate of a vacuum tube which controls the RF output intensity.

Figure 3:
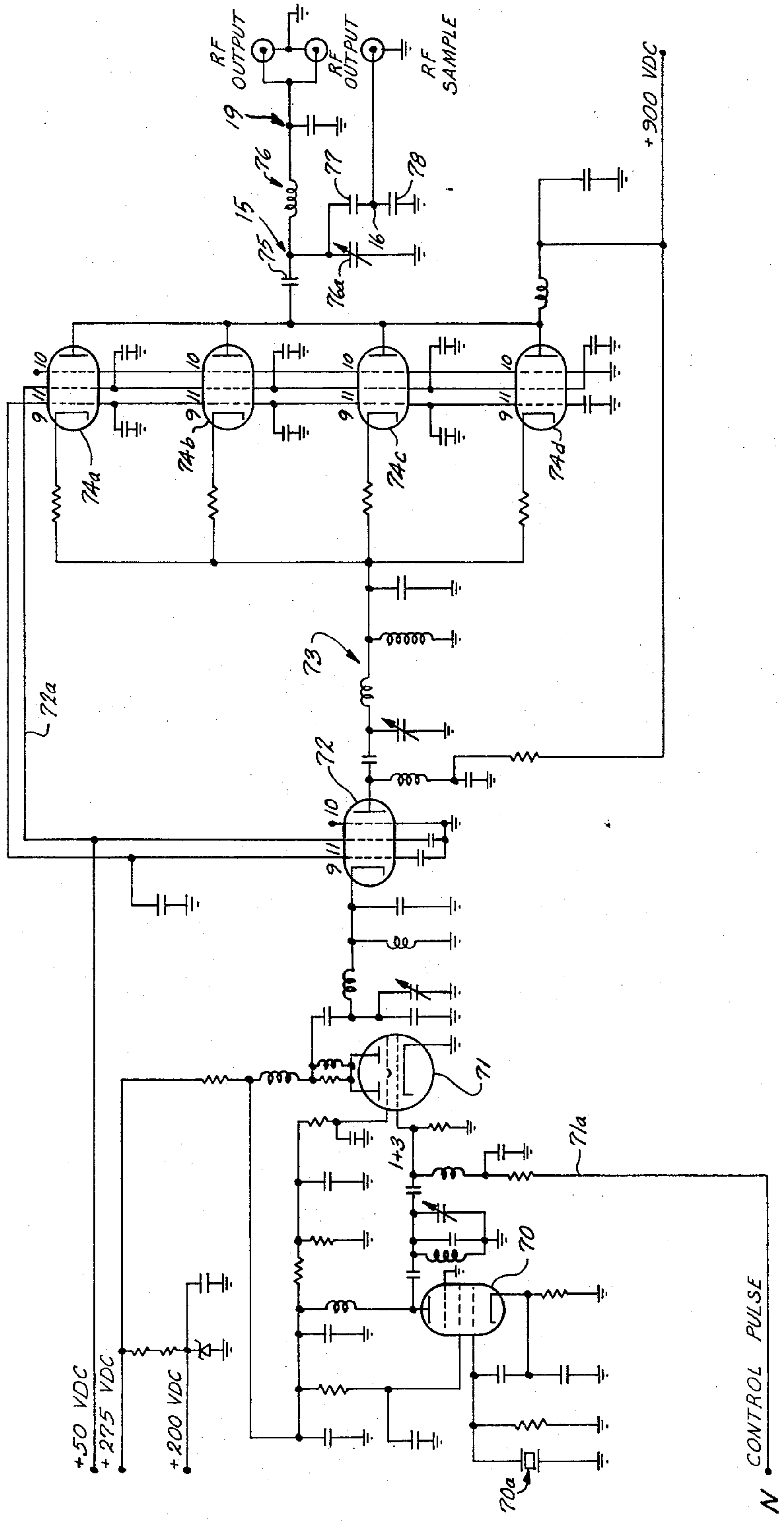
FIG. 3 is a schematic diagram of the RF chassis.

Turning now more particularly to the circuit diagram shown in FIG. 3 and indicated as the RF chassis, a crystal oscillator is schematically indicated as a vacuum tube 70 with the associated crystal 70*a* which produces a signal with the standard 27.225 Mhz frequency. The output of the crystal oscillator from the plate circuit thereof is delivered to the grids (1 and 3) of the pulse modulator 71. The signal control pulse entering on pin N is now of a variable height or amplitude in that it can be varied up and down and controls the amount of level entering the 1 and 3 grid thereby setting the amplitude of the signal (pulse train) coming from the plate of the modulator 71. In this manner, the burst of RF from the modulator 71 is controlled by the pulse on pin N and line 71*a*.

With respect to the above, the pin N is normally at a negative value of about 50 volts so that the pulse modulator (71) is completely biased off in the normal state. Then, when a pulse comes in and raises the pin N value to a less negative preselected bias point this effectively allows a preselected amount of energy to be emitted from the oscillator and modulator to the RF buffer 72 and the associated pi network 73. The output from the pi network in turn drives the cathode of the RF amplifier tubes generally indicated by the numbers 74*a*, 74*b*, 74*c* and 74*d*.

It is important to note that by biasing the screens the RF amplifier tubes (pin 11 of each tube), some may be easily driven without drawing excessive amounts of grid current. The prior art type of power amplifier normally used with this type of therapeutic apparatus comprised a grounded grid amplifier tube configuration which calls for the driving of the cathodes and for the energy output to be taken from the plates. In operation, this particular type of tube required that both the screens and the grids of the tubes to be tied to ground level and the cathode appropriately driven. It has been found that this conventional circuit arrangement results in a large amount of energy in the cathodes so that the tubes had to draw a similarly large amount of grid current before the amplifier tubes would have a power output. As a result the grid was easily over stressed. Further, it was found that if the voltage on the screens were increased to 50 volts a proper voltage condition existed on the screen enabling the tubes to be properly driven without drawing excessive grid current and made a more efficient operation out of the amplifier tubes. Therefore, the line 72*a* is maintained or operated at +50 volts to allow for low standing current (no signal condition) and at the same time to provide for low drawing power.

In the above described power amplifier, pin 11 in each tube is normally associated with the screens therein while pin 10 is the suppressor which is grounded. The screen is tied to about 50 volts and the grid runs actually to a minus 50. Then, the output is from the plates of the amplifier tubes out through the blocking capacitor 75 and to the pi network 76 and to the induction treatment heads 17 and 18. The capacitor 76a is the tuning capacitor while the capacitors 77 and 78 represent the capacitive divider (16*a* and 16*b* in FIG. 1) with the sample point 16*c* provided there for the RF peak off. As mentioned above with respect to the leveling circuit on FIG. 2, the RF sample will be acted on in the precise fashion, fed back to the pin N control pulse line through computor transistor 63 (FIG. 2) and transistor 61 to effect the operation of the crystal oscillator and pulse modulator in the fashion previously mentioned.

Figure 4:
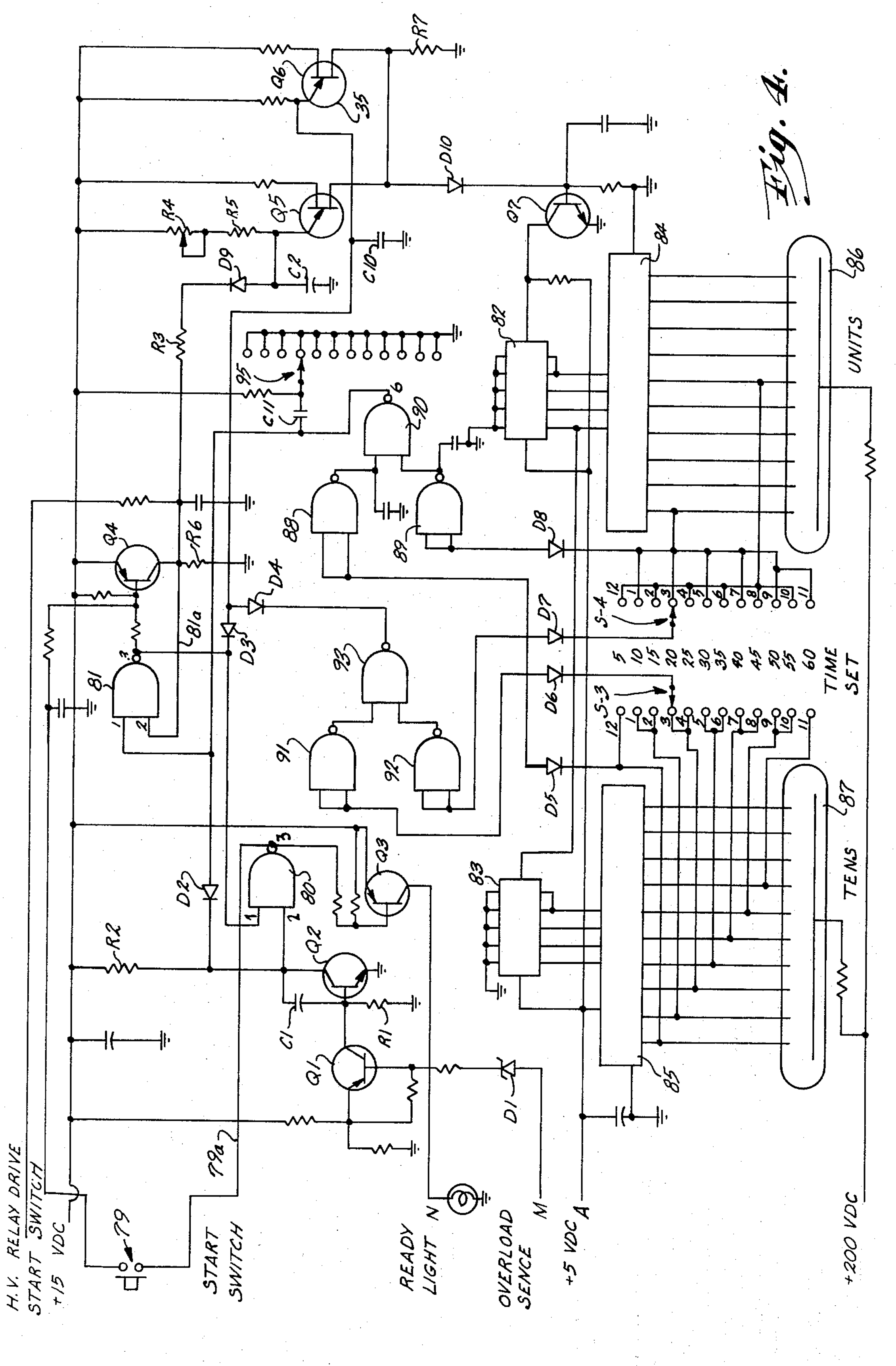
FIG. 4 is a schematic circuit diagram of the time board and count down circuitry utilized with the electrotherapeutic apparatus.

The timer or countdown circuit shown in the FIG. 4 includes a push button switch 79 shown in the upper left hand corner of same which will effectively initiate the operation of this circuit. As was suggested above, this circuit operates to digitally display the time period remaining for patient treatment and includes a resetting function which automatically resets the time period back to the original setting after the time has expired and the apparatus shut off.

The transistor, identified as Q-2 forms a portion of the timing device within the circuit. When the unit is turned on the power supply voltage (+15 volts) through the resistor R-2 charges capacitor C-1 through resistor R-1. The voltage across the resistor R-1 will cause transistor Q2 to turn on. The collector of transistor Q-2 is connected to pin 2 of gate 80 which operates as an inverter gate. The output of gate 80 will then be at a low level with Q-2 having been turned on.

Capacitor C-1 charges after a time delay of 10 to 15 seconds, and the voltage across R-1 becomes too small to maintain Q-2 on. With Q-2 off, and pin 2 of gate 80 goes positive which is inverted at pin 3 to a low or negative value. However, a low or negative condition on pin 3 of gate 80 can only occur if pin 1 of gate 80 is also high which will be discussed, infra.

The overload line indicated at pin M has interconnected circuitry that causes the same time delay to lapse before the unit can be restarted if there is an overload condition. Such an overload condition on pin M is generally originated by the developing of a voltage across a current sensing resistor in the power supply. Therefore, if the diode D-1 exceeds its breakdown level, transistor Q-1 is turned on which causes the base of transistor Q-2 to become conductive thereby discharging capacitor C-1 through the collector-base-emitter circuit. After the time delay, pin 3 of gate 80 is at ground or low potential. When time delay has expired the voltage at pin 3 of gate 80 is low. The start push button return line 79a is also connected to pin 3 of gate 80. When push button 79 is closed, the base of transistor Q-4 is lowered in voltage and causes Q-4 (PNP transistor) to turn on. If time delay has not expired or an overload has occurred, pin 3 of gate 80 will be high and closing of push button will not allow turn on of Q-4. As suggested, gate 81 and Q-4 comprise a testable latch. Feedback from the collector of Q-4 to pin 2 of gate 81 acts as a latch for that portion of circuit. Accordingly, the collector on Q-4 goes positive and puts a positive pulse on pin 2 of gate 81. Then pin 3 of gate 81 will go low which in turn puts a negative or ground potential on the base of Q-4 which has been previously applied by the activation of the push button. Therefore, when the push button (79) is released this circuit still stays on.

When the collector of Q-4 goes positive, it removes the block (or lock) on the capacitor C-2 through the diode D-9 and resistor R-3 (when the collector Q-4 goes positive, the positive potential on the cathode of D-9 turns it off). It shall be noted that resistors R4, R-5 and R-6 keep capacitor C-2 clamped to some positive value so that it will not entirely discharge, but Q-5 (a unijunction transistor) conducts when the charge on capacitor C-2 reaches a preset value (the C-2 time constant will be one minute). When the unijunction Q-5 fires, the discharge circuit through resistor R-7 causes a positive voltage pulse to appear across resistor R-7 and through diode D-10 to the base of transistor Q-7. Transistor Q-7 amplifies the pulse and develops a sharp trigger pulse into the input of the decade counter 82. (Decade counters 82 and 83 are cascaded to comprise a count of from 0 to 99, however, the count need only go from 0 to 60 in this instance.)

Decaders 84 and 85 operate to convert the binary coded decimal outputs of counters 82 and 83 to 10 outputs. That is, one of the 10 lines will have a ground condition thereon that corresponds to a number from 0 to 9. The two display tubes (86 and 87) have the anode of same at a positive potential so the ground condition and an above mentioned line (one of the 10) will cause the selected number to be illuminated. It is, however, important to note that the numbers on the tubes 86 and 87 are reversed so that it is a down counter and not an up counter. Therefore, due to the time constant on the unijunction charging circuit (capacitor C-2) the unijunction Q-5 is essentially a one minute pulse circuit to enable the count down to take place. Stated another way, the connections in the tubes 86 and 87 are such that the 9 element is interconnected to the counters in the place where the 0 element used to be.

During the countdown process, when the tubes 86 and 87 arrive at 0, there is an ANDING through the diodes D-5 and D-8. At this time, the voltage on the cathodes of D-5 and D-8 go low. When 0 (count on the tube 86 and 87) is reached, this causes the inputs of gates 88 and 89 to go low and the outputs of gates 88 and 89 to go high. Gate 90 is a NAND gate and therefore when both inputs to gate 90 are high the output on pin 6 goes low.

The output of gate 90 accomplishes several things. For example, output goes to pin 1 of gate 81 causing the output of gate 81 to then become high and to turn Q-4 off (unlatch the latch). This stops counting because diode D-9 is now conducting. The output also back biases diode D-3 and, depending on diode D-4, takes the clamp off of capacitor C-10. This will turn on unijunction Q-6 which is a high frequency oscillator capable of producing about 10,000 pulses per second through diode D-10 through the counters 84 and 85.

As shown in the diagram, when the pulses are counted so that the display tubes 86 and 87 show a 0 and a 2 respectively, (the counters are connected in the 20 condition with the two movable switches S-3 and S-4 on the 3 terminal of each) then the cathodes of diodes D-6 and D-7 go low. Inputs to gates 91 and 92 go low with the corresponding outputs high then the gate 93 output goes low and reclamps through diode D-4 to capacitor C-10 to stop Q-6 (high pulse oscillator).

There are two ways to stop the fast count operation of transistor Q-6:

1. The latch on Q-4 sets diodes D-3 and clamps same;
2. switching of preset number with count being at that number, then diode D-4 stops the count.

Also the fast count is stopped when it counts down in minutes.

The latch (gate 81 and transistor Q4 when turned on allows a plate relay in the voltage supply to become energized but when the count reaches 0, it (the relay) becomes deenergized and turns off the power (the plate) even though the filaments are still on. An overload condition on pin M operates to cause the diode D-2 to turn off the latch (gate 81 and transistor Q-4) and the power is then off. Further, as the time selection switch deck 95 is rotated it causes a pulse through capacitor C-11 to gate 81 thereby resetting the latch comprising gate 81 and transistor Q-4. This action eliminates an "unlatched switch" and makes sure that the latch is always reset after the timing numbers are changed.

Turning now to the important physical construction of the unit (FIGS. 6–17) numeral 100 represents the cabinet which houses the electrical circuitry and the display portion of the short wave electrotherapeutic apparatus. A pair of push buttons 101 and 102 are mounted in a horizontal plane on the forward portion of the cabinet. Push button 101 represents an on and off switch for the unit while push button 102 depicts a high voltage switch which is automatically ganged with the later discussed time display and turn knob.

Display tubes 103 (having illuminatable numbered filaments) are located on the upper left hand near vertical surface 100*b* of cabinet 100 and indicates the pulse rate number 103*a*, which represents the turn knob that facilitates the setting of the switch S-1 on the rate board (FIG. 3) and physically moves the switch contact (S-1) so that the display on the display tube 103 appropriately change. Numeral 104 depicts a similar type of display tube for the power which will display the numbers of 1 through 12. The power settings are manually effected by the turn knob 104. Numeral 105 represents the display oscilloscope which is capable of visually monitoring the pulse amplitude and the rate of the RF energy emanating through the induction heads 17 and 18. The timed display which displays 5 60 minute intervals is represented by the numeral 106 and counts (backwards) downwards to 0 and then resets itself back to the original (start) start time. The turn knob 106*a*, which is associated therewith, is electrically connected with the high voltage switch so that when the knob is turned to another position, the high voltage will automatically turn off.

The left hand side panel of the cabinet (100*a*) include bracket provisions for mounting the extendible arms which support the induction heads 17 and 18 thereon. For example, there are two brackets 107, each of which include a vertical plate 108 bolted to the side panel 100*a* by the bolts 108*a*. Upper and lower opposed horizontal plates 109 and 110 respectively, rigidly extend from each vertical plate 108 and provide a locating surface for a vertical pivot pin which will be described in more detail later. The outer end portions of the two opposed plates is suitably apertured and appropriately spaced apart so that the internally threaded end portion of the short horizontally mounted arm piece 111 will communicatingly be associated with the horizontal plate (109 and 110) apertures. The short arm piece 111 is substantially flat in construction with the internally threaded inner end portion 111a capable of threadably receiving a screw 112 through the apertured end portion of lower plate 110. A phenolic washer 113 provides a bearing service on which the end portion 111*a* is permitted to turn. A knurled headed bolt 114 with an upper tapered shaft 114*a* extends through a split sleeve 115 within the counter boare 116 in the end 111a. As the bolt 114 is tightened down so that the screw shaft 114*b* moves downwardly the tapered shaft portion 114*a* causes the split sleeve 115 to separate or to otherwise spread outwardly against the sides of the counter board thereby effecting a tightened condition with respect to the counterbore. In this fashion, the arm 111 will remain in a substantially preset vertical plane but will be pivotally movable substantially 180° about the bolt 114 with a controllable amount of force. Also, with the above construction, the bolt 114 may be within the swingable arc. This gives the treatment heads (17 and 18 located on the later described arms) a great deal of movement for optimum positioning with respect to the patient or patient's body (or patient's bodies).

Each arm is comprised of at least two segments which are articulated by a uniquely constructed lock arrangement. For instance, the arm segment 117 is interconnected to the short arm piece 111 by the lock 118 and the arm segment 119 is interconnected to arm 117 by a similarly constructed lock joint (also identified by the numeral 118).

Figure 8:
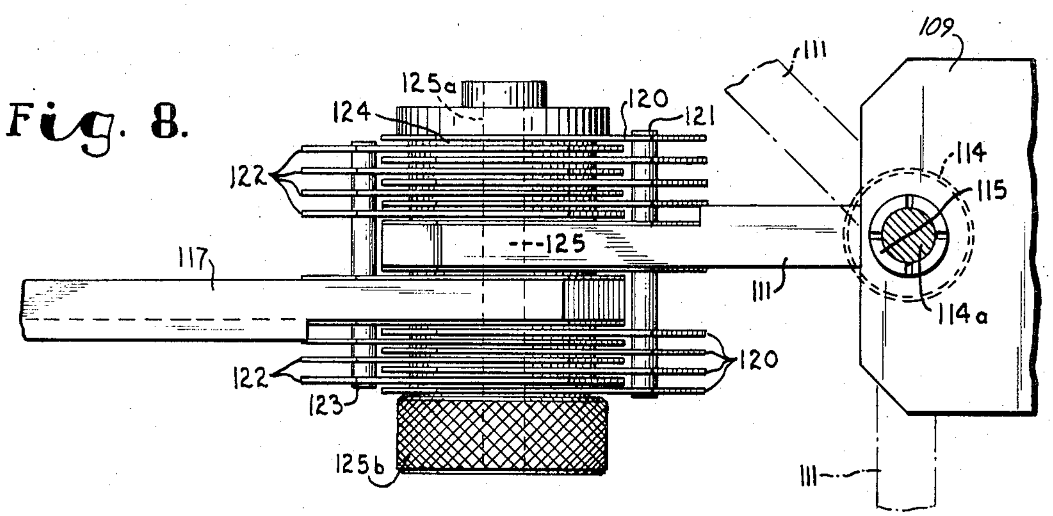
FIG. 8 is a view taken substantially along the line 8—8 of FIG. 7 in the direction of the arrows.

Since the lock joints are substantially identical, the operation and construction may be understood by reference to FIGS. 7 and 8. As shown in FIG. 8, the lock points are comprised of a plurality of plates 120 which are physically connected to the short arm piece 111 by pin 121. Plates 120 are interleaved with similarly shaped plates 122 which are fixedly interconnected with the attached arm 117 by the pin 123. Each plate is separated by a phenolic washer 124 (FIG. 8) which is centrally apertured (as are the plates) to accept the shaft of the end threaded bolt 125. One end of the bolt 125 is fixedly connected to plate 125*a* which will bear against the outermost plate 120. A knurled nut 125*b* will threadably engage opposite end of bolt 125 as the bolt extends through the aligned apertures in the interleaved plates 120 and 122 with phenolic washers 124. Accordingly, the tightening of the knurled nut 125*a* compresses the interleaved plates and washers so that the weight of the arm segments will not move the lock joint position, accordingly arm 117 may be placed at any location relative to the pivot point (bolt 125) within an almost 180° arc.

As shown in FIG. 7, arm segment (bolt 125) may be moved back toward the cabinet side panel 100a until the pin 123 contacts the upper surface of the short armpiece 111. Likewise, the afforded downward movement of arm 117 is limited only to the end extremity of the arm segment 117 contacting the side panel 100a. Likewise, the arm segment 119 may be articulated with respect to arm 117. In this fashion, an appropriate amount of tension may be placed on the lock joint so that the arms can be adjustably positioned without requiring the knurled nut 125*b* to be readjusted. Accordingly, once the proper degree of friction has been set on the lock joint the arm segments may be pivotally moved to any desired location and will be held in place by the frictional contact between interleaved plates and the phenolic washers.

Figure 10:
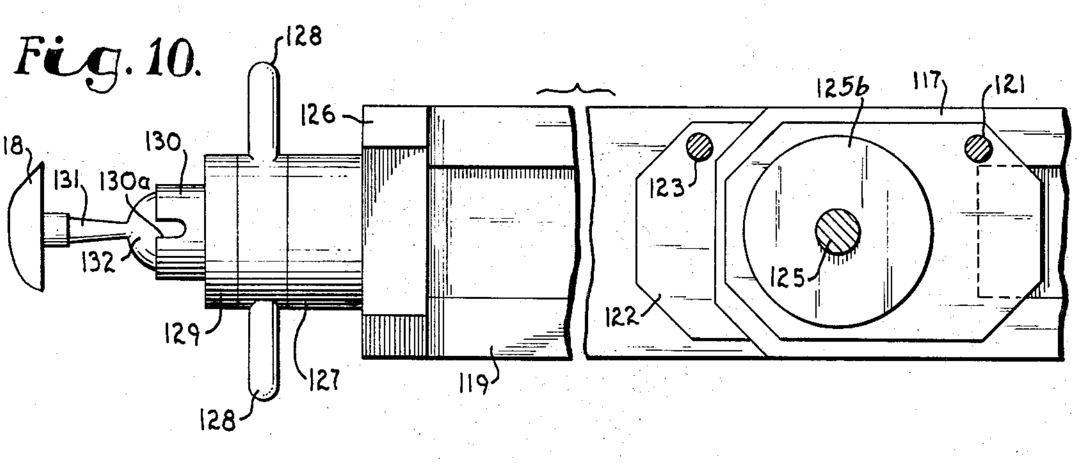
FIG. 10 is a side elevational view of the arm segment and induction head interconnecting means along with the friction lock.
Figure 11:
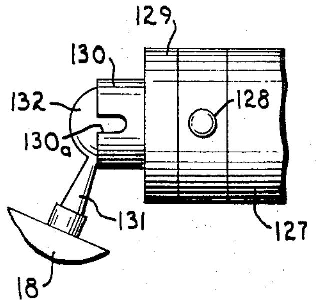
FIG. 11 is a side elevational view of the swivel head interconnecting means for the induction head showing a limit position to which the head may be moved.
Figure 12:
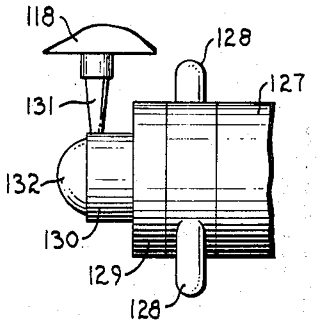
FIG. 12 is a view similar to FIG. 11 but showing the induction head tapered pin interconnect moved within a notch or slot of the associated ball socketing for further position of the induction head.

The induction heads 17 and 18 are connected to their respective outer arms by the ball and socket swivel interconnection shown in detail in FIGS. 10, 11 and 12. For instance, the outer arm segment 119 shown in FIG. 10 has a flat plate 126 located transversely with respect to the longitudinal center line thereof and with the cylindrical outer projection 127 weldedly connected thereto. A rotatable nut tightener with wings 128 assist in the interconnection of the socket plate 129 and removably supports the socket 130 on extension thereof.

Each head (17 and 18) will have a tapered pin 131 extending therefrom with a ball 132 on the end extremity thereof. This ball (132) swivally mounts within the socket 130. Further, each socket will have a U-shaped slot 130a formed therein as shown in the above mentioned views (FIGS. 10, 11 and 12). In this fashion, the swivel mount for the head is permitted to move past the outer end extremity of the socket by locating the tapered end of the pin 131, within the slot 130a thereby giving additional movement to the head as shown in FIG. 12. This may be advantageous to positioning the head on certain awkward parts of the patient's body.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations.

As many possible embodiments may be made of the invention without departing from the scope thereof, it is to be understood that all matter herein set forth or shown in the accompanying drawings is to be interpreted as illustrative and not in a limiting sense.

Having thus described our invention, we claim:

1. A short wave electrotherapeutic apparatus, said apparatus comprising
- means for producing electrical RF energy,
- at least two means for inducing RF energy in at least one patient, said means being operable independently of each other and having a substantially constant impedance,
- means for connecting said inducing means to said RF energy producing means, and
- means for automatically maintaining a constant power output from said RF energy producing means.

2. A short wave electrotherapeutic apparatus, said apparatus comprising
- means for producing electrical RF energy, at least two independently operating induction treatment heads,
- means for connecting said heads to said RF energy producing means, and means cooperating with said connecting means being operable to assist in the balancing of said heads to thereby enable substantially equal amounts of RF energy to be induced in at least one patient from said treatment heads.

3. A short wave electrotherapeutic apparatus having an oscillator for producing RF electrical energy, means for modulating said RF energy, a power amplifier for amplifying said RF energy and having an amplified output therefrom, and at least two independently operating induction heads connected to said amplified RF energy output for inducing said amplified RF energy in a patient for treatment purposes, the improvement comprising
- a reference means for determining the level of the amplified RF energy from said RF power amplifier,
- means for comparing said RF energy level with said reference level means, said reference means having an output indicative of a difference in said RF level and said reference level means, and
- means for utilizing said difference output to adjust the output of said RF power amplifier to correspond to a desired level of intensity as determined by said comparison means.

4. The combination as in claim 3, including means for varying the peak intensity of said RF energy emanating from said RF power amplifier.

5. The combination as in claim 3, including means for varying the rate of said RF energy emanating from said RF power amplifier.

6. In a shortwave electrotherapeutic apparatus having an oscillator for producing RF electrical energy, means for modulating said RF energy, a power amplifier for amplifying said modulated RF electrical energy and having an amplified output therefrom, and at least two independently operating induction heads connected to said amplified RF energy output for inducing said RF energy into a patient for treatment purposes, the improvement comprising
- an oscilloscope monitoring means, and
- means interconnecting said oscilloscope monitoring means with said RF power amplifier output, said oscilloscope monitoring means thereby monitoring the energy applied to said induction head and visually displaying same to an operator of said apparatus.

7. The combination as in claim 6, including at least two induction treatment heads, means for fix tuning said induction heads, and
- means cooperating with said tuning means for balancing said heads to thereby enable substantially equal amounts of RF energy to be induced in at least one patient from said heads.

* * * * *

UNITED STATES PATENT OFFICE
CERTIFICATE OF CORRECTION

Patent No. 3,800,802 Dated April 2, 1974

Inventor(s) Fred M. Berry, James N. Shirley & Eugene C. Lipsky

It is certified that error appears in the above-identified patent and that said Letters Patent are hereby corrected as shown below:

Column 2 -- Line 51 --"tube" should be --to--.
Column 3 -- Line 16 --"feature" should be --features--.
Column 4 -- Line 19 --"permit" should be --permits--.
Column 4 -- Line 25 --"number" should be --numbers--.
Column 4 -- Line 29 --"highly" should be --slightly--.
Column 5 -- Line 25 --"effect" should be --affect--.
Column 5 -- Line 56 --"borads" should be --boards--.
Column 6 -- Line 5 --"connected" should be --connect--.
Column 6 -- Line 38 -- delete "and", second occurrence.
Column 7 -- Line 25 --"gate" should be --gates--.
Column 7 -- Line 40 --"appearing" should be --appears--.
Column 8 -- Line 20 --"some" should be --same--.
Column 8 -- Line 28 -- delete "to" (first occurrence).
Column 8 -- Line 58 --"computor" should be --comparator--.
Column 10-- Line 55 -- parenthesis should be closed after "Q4".
Column 11-- Line 2 --"(FIGS. 6-17)" should be --(FIGS. 6-12)--.
Column 11-- Line 18 --"change" should be --changes--.
Column 11-- Line 53 --"service" should be --surface--.
Column 11-- Line 56 --"boare" should be --bore--.
Column 12-- Line 63 --"swivally" should be --swivelly--.

Signed and sealed this 5th day of November 1974

(SEAL)
Attest:

McCOY M. GIBSON JR.
Attesting Officer

C. MARSHALL DANN
Commissioner of Patents

USCOMM-DC 60376-P69
☆ U.S. GOVERNMENT PRINTING OFFICE : 1969 O—366-334.